July 7, 1959  F. J. MAKOVIC, JR., ET AL  2,893,905
APPARATUS FOR PRESSING CURVED GLASS LAMINATIONS
Filed Dec. 30, 1952  5 Sheets-Sheet 5
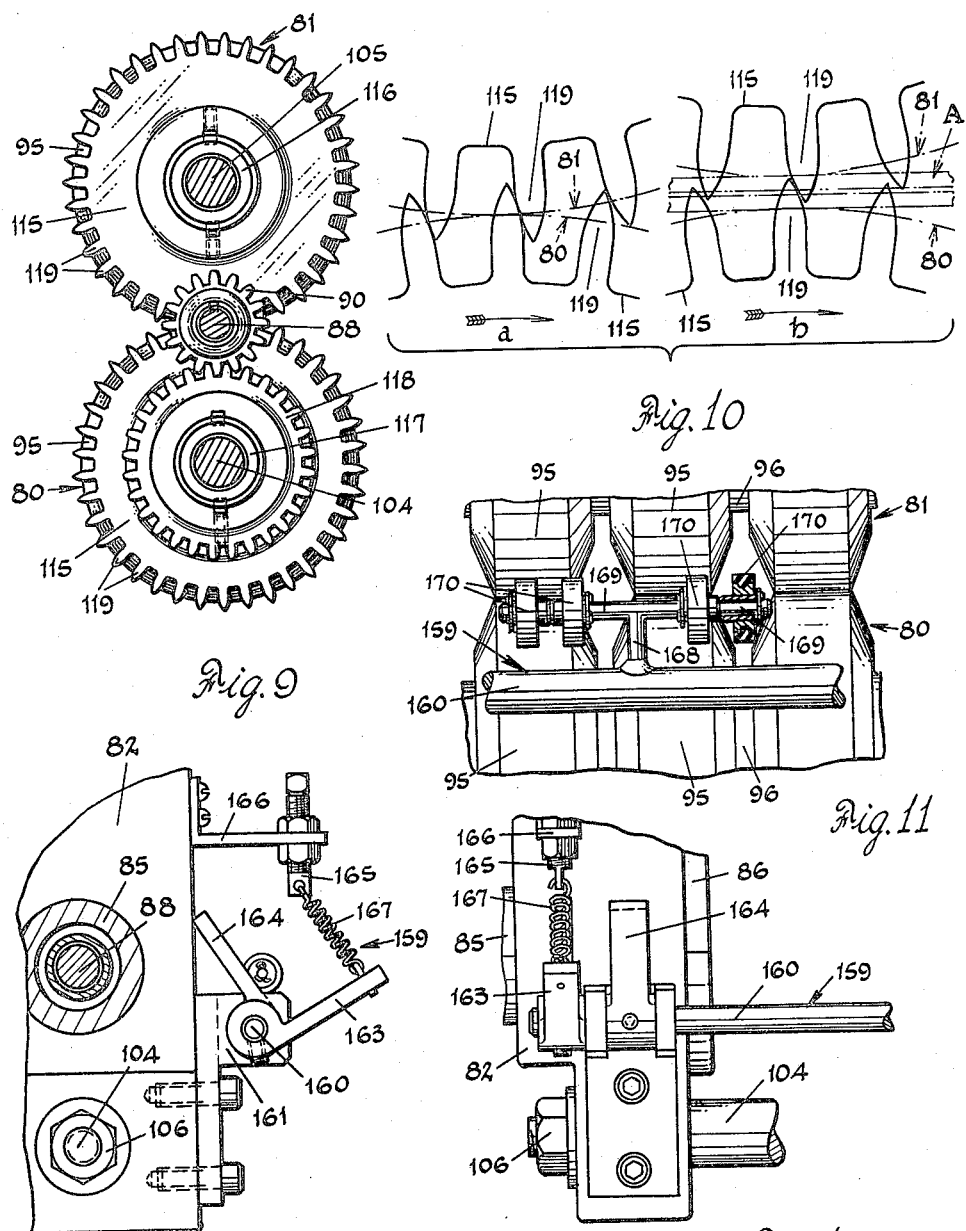

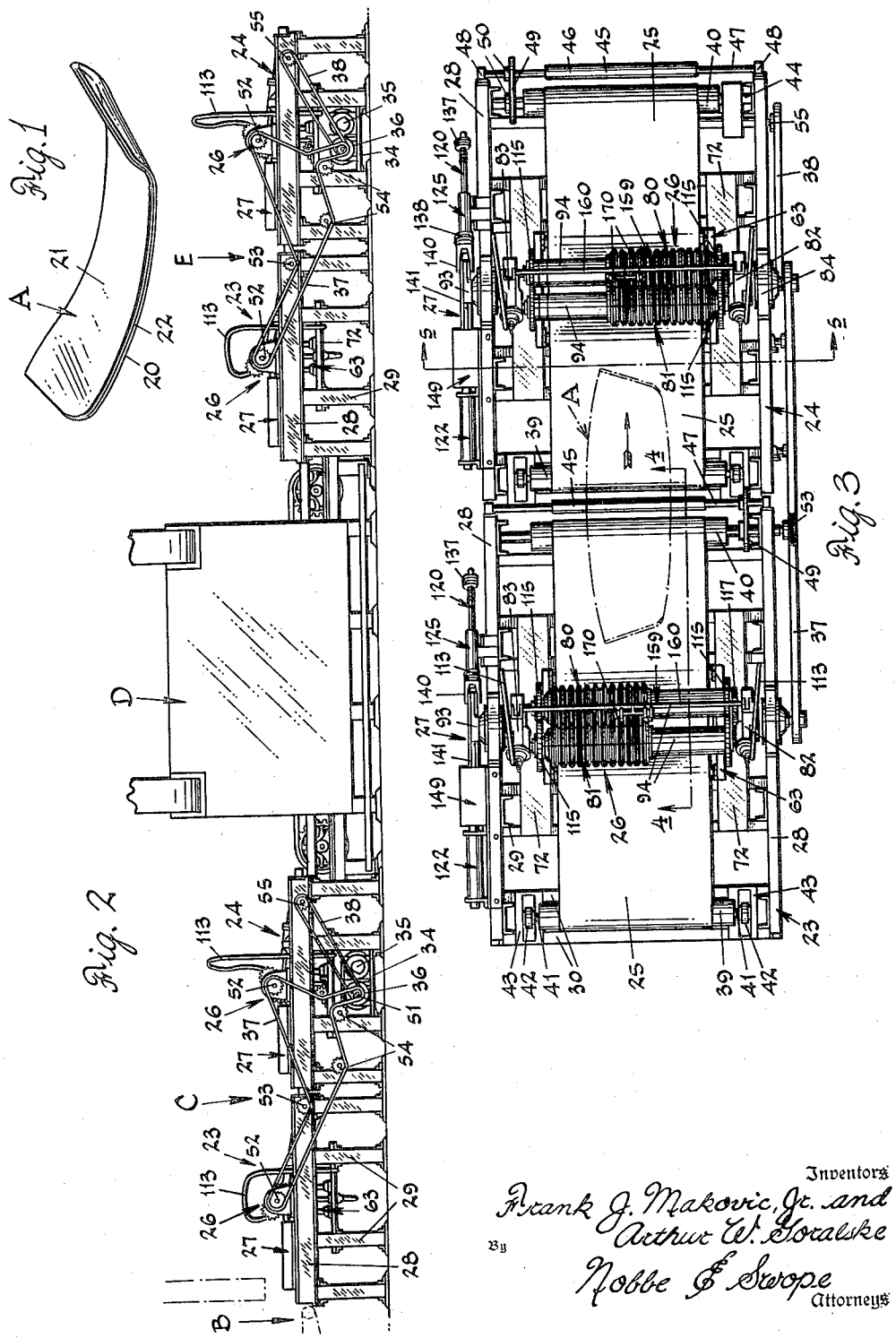

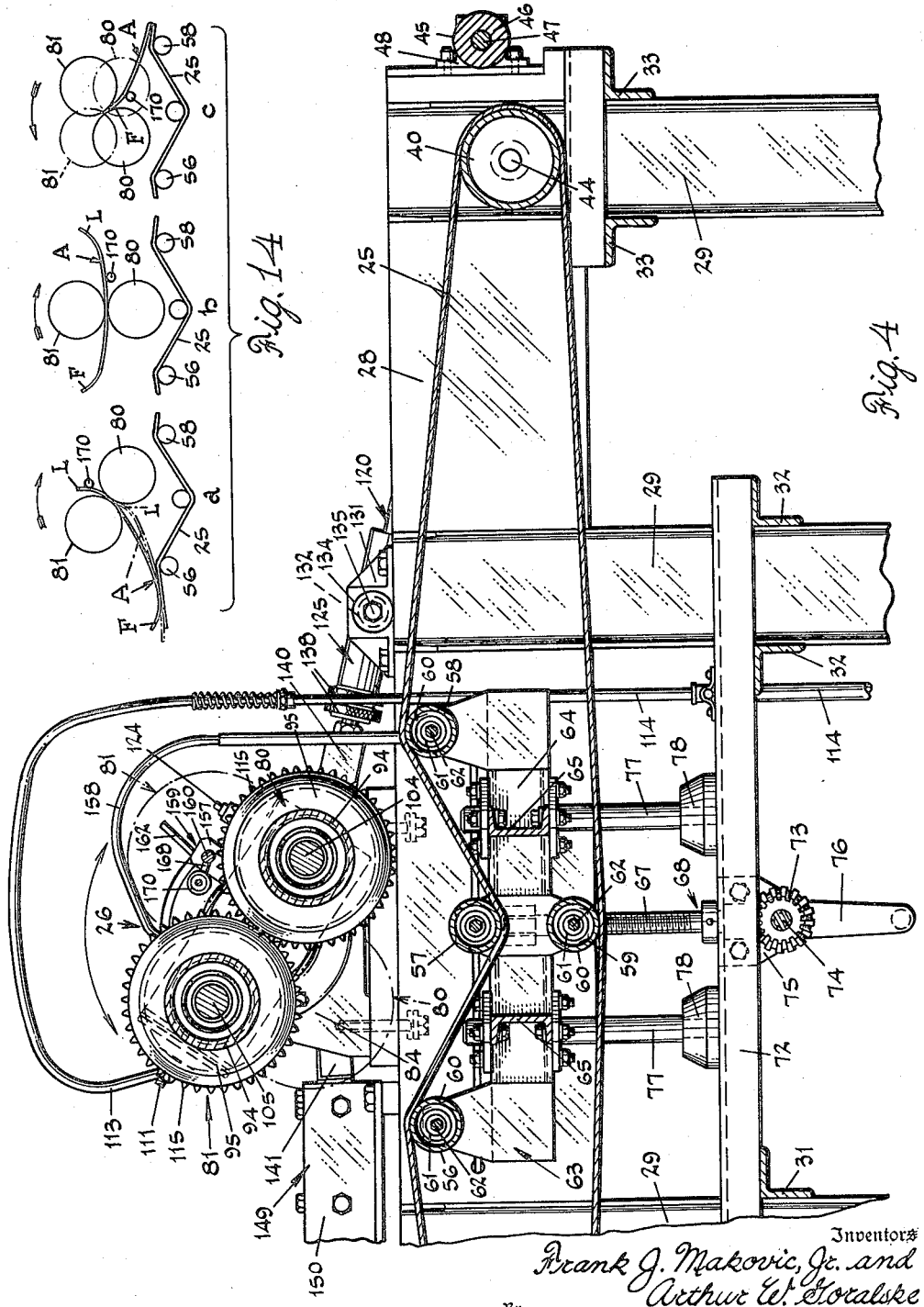

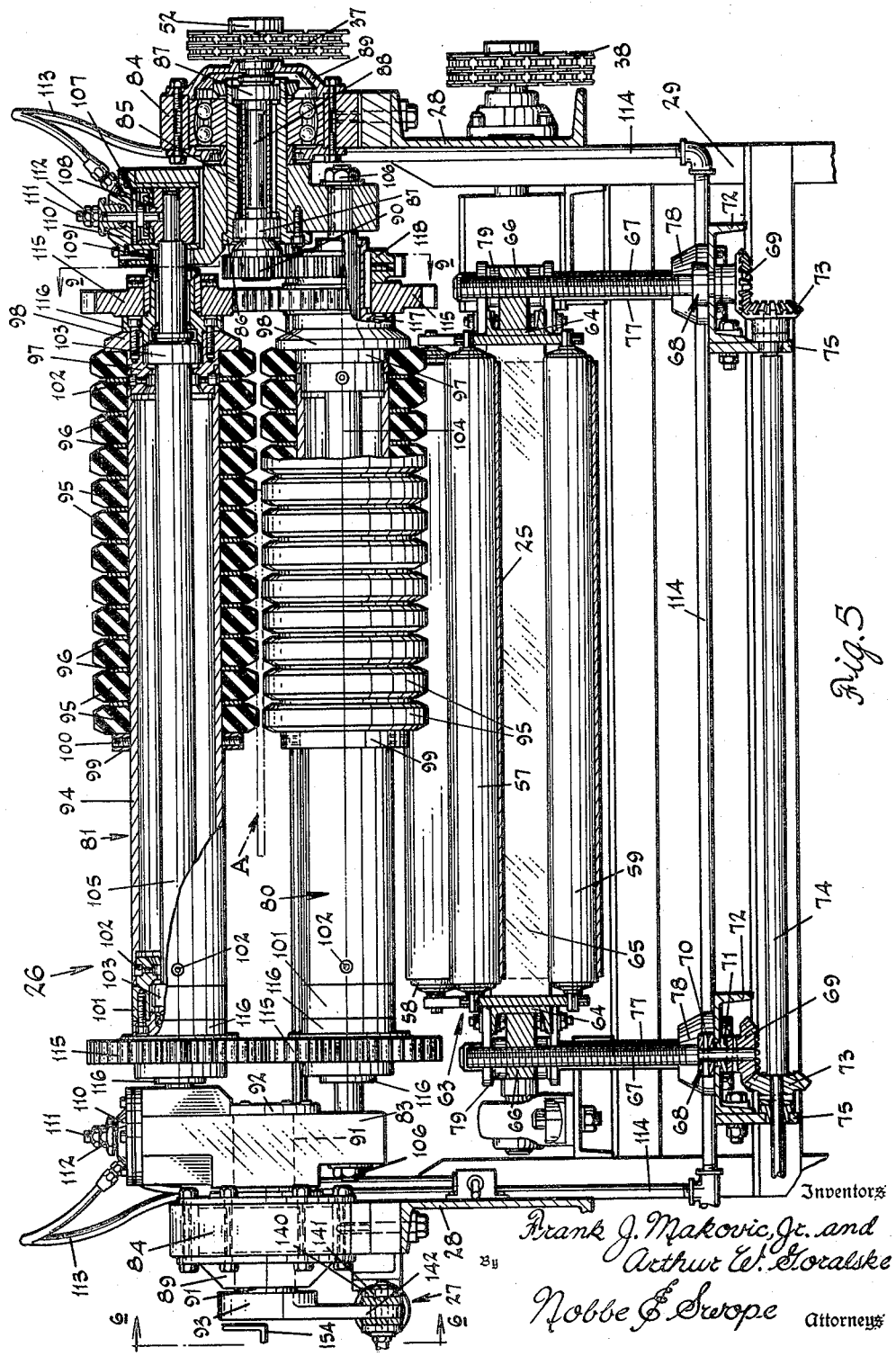

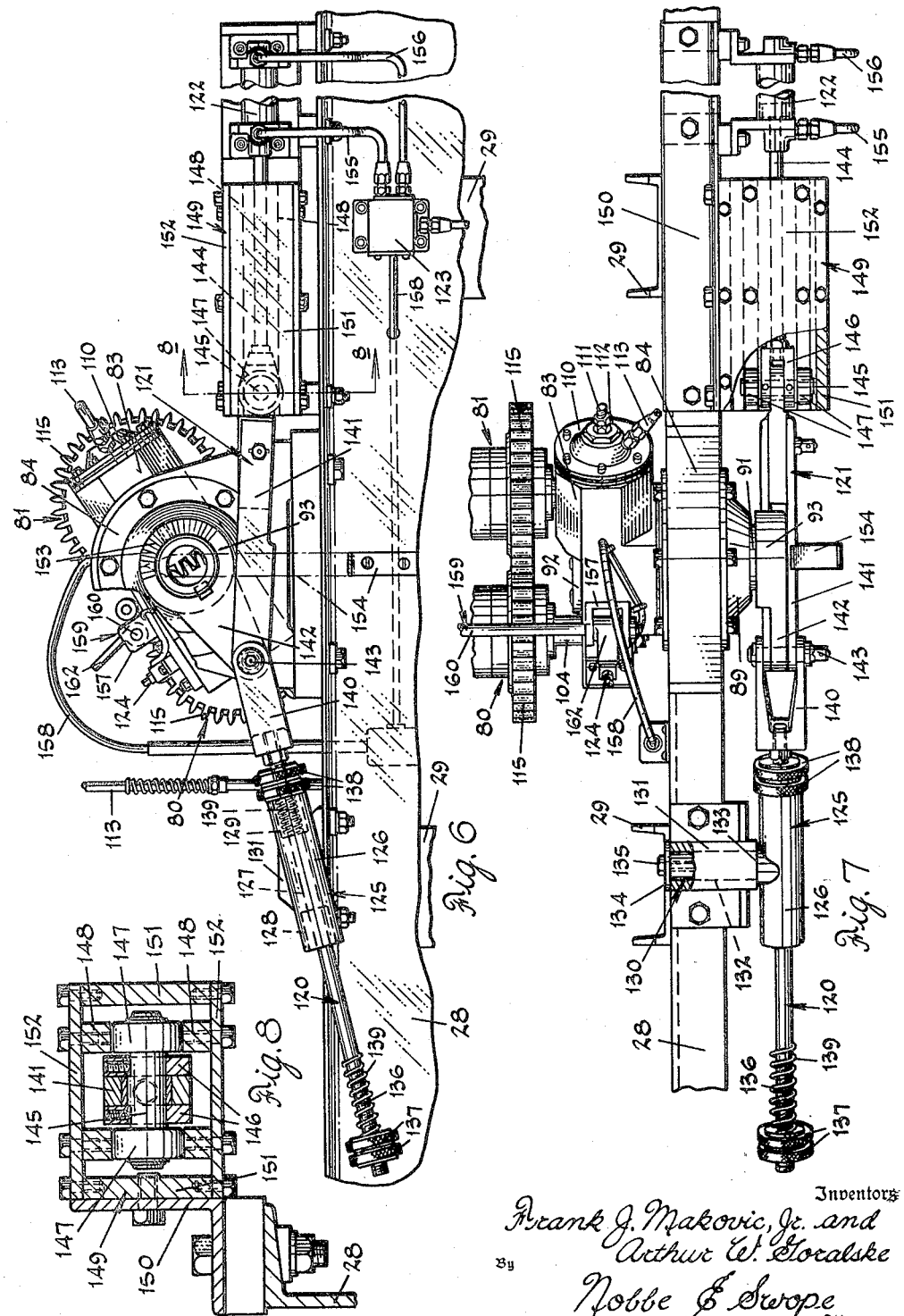

United States Patent Office 2,893,905
Patented July 7, 1959

2,893,905

APPARATUS FOR PRESSING CURVED GLASS LAMINATIONS

Frank J. Makovic, Jr., and Arthur W. Goralske, Toledo, Ohio, assignors to Libbey-Owens-Ford Glass Company, Toledo, Ohio, a corporation of Ohio Application December 30, 1952, Serial No. 328,672

12 Claims. (Cl. 154—2.7)

The present invention relates broadly to the manufacture of laminated safety glass. More particularly, this invention has to do with an improved method and apparatus for pressing assemblies of curved glass sheets and plastic interlayers preparatory to the final compositing operation.

Briefly stated, laminated safety glass comprises two or more sheets of glass and one or more sheets of non-brittle thermoplastic material, all bonded together under the action of heat and pressure to form a composite unit. In the manufacture of laminated glass, the general procedure is to first assemble the glass sheets and plastic interlayer, or interlayers, to form a so-called "glass-plastic sandwich," to next subject the sandwich to relatively light, initial or preliminary, pressure for the purpose of removing entrapped air from between the laminae and to close the edges thereof, and to then subject the prepressed sandwich to a final treatment under heat and pressure in an autoclave to bring about complete and final compositing of the laminations.

It is an aim of this invention to provide an improved method and apparatus for the pressing of assembled curved glass sheets and plastic laminae, and which is especially adapted for use in the preliminary pressing of deeply bent or curved glass sheets.

Another object of the invention is to provide an improved method for pressing curved glass-plastic sandwiches of the type wherein the bent contour proceeds outwardly in at least one or in both directions from a relatively shallow curved central area into end areas which rise sharply from said central area, and a novel apparatus for carrying out such a method in a continuous, sequentially occurring mode of operation.

Another object of the invention is to provide a novel roll-type pressing apparatus wherein a pair of parallel rolls are oscillated or rocked about a common axis as a curved glass-plastic sandwich passes therebetween in order that the leading area of the sandwich will be received between the rolls along a tangential plane common to the rolls and ejected therefrom at the following area thereof along a similar tangential plane common to the rolls.

Another object of the invention is to provide a novel roll-type pressing apparatus of the above character wherein a pair of pressing rolls are oscillated or rocked about a common axis from one oriented position, in which said rolls are angularly disposed to the vertical to receive therebetween a deeply curved glass-plastic sandwich at its leading area along a tangential plane common to the rolls, to a second oriented position from which said sandwich will emerge at its following area along a tangential plane common to the rolls.

A further object of the invention is to provide a novel roll-type pressing apparatus of the above character wherein a pair of rolls are adapted to be oscillated or rocked about a common axis to receive and eject a deeply curved glass-plastic sandwich along a tangential plane common to the pair of rolls, and means actuated by said sandwich for causing oscillation of the pair of rolls as the sandwich passes therebetween.

A still further object of the invention is to provide a roll-type pressing apparatus of the above character wherein curved glass-plastic sandwiches are carried forward continuously and during such movement are subjected to roll pressure which is first applied in a longitudinal strip along one marginal area of the sandwich and then, in sequence, in a longitudinal strip along the oppositely disposed marginal area thereof.

Other objects and advantages of the invention will become more apparent during the course of the following description when read in connection with the accompanying drawings.

In the drawings, wherein like numerals are employed to designate like parts throughout the same:

Fig. 1 is a perspective view of an assembled glass-plastic sandwich in which the sheets of glass are bent longitudinally to conform to a deeply bent curvature;

Fig. 2 is a side elevation of a pressing production line employing the roll-type pressing apparatus of the invention;

Fig. 3 is a top or plan view of a pressing apparatus constructed in accordance with the invention;

Fig. 4 is a longitudinal, vertical sectional view taken on line 4—4 of Fig. 3;

Fig. 5 is a transverse, vertical sectional view taken substantially on line 5—5 of Fig. 3 and wherein the pressing rolls are shown at a midpoint of their oscillating movement;

Fig. 6 is a fragmentary side elevation of the pressing apparatus viewed in the direction of the arrows 6—6 of Fig. 5;

Fig. 7 is a plan view of the apparatus illustrated in Fig. 6;

Fig. 8 is a sectional detail view taken on line 8—8 of Fig. 6;

Fig. 9 is a sectional detail view taken on line 9—9 of Fig. 5;

Fig. 10 is a diagrammatic view illustrating the displacement of the gears shown in Fig. 9;

Fig. 11 is a detail view of the control mechanism for the pressing apparatus;

Fig. 12 is a side view of the mechanism;

Fig. 13 is an end view of the mechanism shown in Fig. 12, and

Fig. 14 is a diagrammatic illustration of the progressive motions of the glass-plastic sandwich and pressing rolls during one complete pressing cycle.

Pressing apparatus, embodying the features of this invention, are particularly well adapted for producing the preliminary, relatively light pressure on pre-assembled sandwiches of bent glass sheets and the thermoplastic interlayers that are eventually employed as one-piece laminated safety glass windshields for automobiles. This constitutes one of the most difficult types of lamination to pre-press because for this purpose the glass sheets, after being pattern-cut in matched pairs, are so bent that their curvature, in the longitudinal axis, includes not only a major central area of relatively shallow curvature but also opposite end areas of curves that rise sharply from the central area.

After the glass sheets have been bent, they are carefully washed, dried and then assembled with a non-brittle thermoplastic interlayer to form the so-called "sandwich." Such an assemblage is generally indicated at A in Fig. 1 wherein the lower bent glass sheet 20 and the conforming upper bent glass sheet 21 are separated by the thermoplastic interlayer 22. In commercial production, this assembly is preferably made up in an air-conditioned room, indicated at B in Fig. 2, and is carried thence on a conveyor to a first pressing apparatus C. Then after passing through a warming oven D, it may be subjected to pressure in a second pressing apparatus E from which it is removed and placed in suitable tubs preparatory to the final treatment, usually by a liquid under heat and pressure in an autoclave.

According to the present invention, such deeply curved glass-plastic sandwiches as those forming a one-piece bent windshield, or the component bent glass sheets of a comparably curved two-piece windshield, can be received in the pressing apparatus C or E and be carried between the pressing rolls thereof in such a fashion that the upwardly rising leading area will enter between said rolls along a tangential plane that is common to both the rolls, as indicated diagrammatically at the left of Fig. 14. Then, as the sandwich passes through the rolls, the rolls are automatically caused to oscillate or "rock" to a second position from which the sandwich will move with its following area proceeding along a tangential plane common to the rolls (extreme right in Fig. 14). The glass-plastic sandwiches themselves cause the oscillatory or rocking motion of the rolls by engagement with a control member (to be more clearly hereinafter described) which is adapted to produce the motion in one direction when engaged and to reverse the motion when released to re-position the rolls for the so-called "prepressing" of a subsequent glass-plastic sandwich.

Thus, referring to Figs. 2 and 3, the assembled glass-plastic sandwiches are first subjected to the so-called "prepressing" action of relatively light pressure in the apparatus C to exhaust entrapped air from a longitudinal strip along one marginal area and then from a longitudinal strip along the opposite marginal area; they are then carried through a moderately heated area to slightly soften the plastic interlayer and are again subjected to pressure in the same two longitudinal strips or areas of their surface to secure intimate contact between the plastic interlayer and the adjacent surfaces of the glass sheets and to seal the edges of the sandwiches. These preliminary pressing operations are intended primarily to make sure that the glass sheets and plastic interlayers are in sufficiently close contact that the liquid in the autoclave will not penetrate between the layers and thus create blow-ins or interfere with the integral and permanent bonding of the plastic interlayer to the glass, and are perhaps the most difficult and exacting procedure in the entire bent laminating technique.

Each of the pressing apparatus C and E, as here constructed in accordance with the invention, have two substantially identical frameworks 23 and 24 on each of which an endless conveyor belt 25 is arranged to carry the glass-plastic sandwiches A to be pressed; a roll-type pressing assembly 26 in which the sandwich is subjected to the initial, relatively light pressure; and an oscillation-generating mechanism 27 by means of which the pressing assembly 26 is caused to oscillate or "rock" as the sandwich enters and leaves the pressure area between the rolls.

Each framework, 23 or 24, generally comprises horizontally disposed side channels 28 that are supported by vertically upright standards 29. Suitably spaced transversely between the channels 28 are pairs of horizontally disposed angles or beams 30, 31, 32 and 33, the outermost pairs of beams 30 and 33 forming the end framing members of each framework 23, 24. And arranged centrally between the ends of the framework 24 and beneath the side channels 28, there is a platform 34 which carries the power equipment of the apparatus including an electric motor 35 and a speed-reduction transmission unit 36. The transmission unit 36 is connected so as to drive the conveyor belts 25 and to operate the pressing assembly 26 of the apparatus by means of sprocket chains 37 and 38.

More particularly, the conveyor belt 25 of each framework 23 and 24 is trained about rollers 39 and 40 in the ends of said frameworks. The roller 39, in each instance, is provided with stub shafts 41 that are journaled in bearings 42 mounted on plates 43 carried by the pair of beams 30. Likewise, the roller 40 is provided with stub shafts 44 which are rotatably supported on the channels 28. As shown in Fig. 3, each framework is equipped with an auxiliary roller 45 which comprises a suitable rubber sleeve 46 secured to a shaft 47 that is journaled in bearings 48 carried by the side channels 28. In each instance, the stub shafts 44 and shafts 47 are provided with sprockets 49 about which are trained chain belts 50 to rotate the rollers 45.

As best seen in Fig. 2, the conveyor belt 25 of the framework 23 is driven by the sprocket chain belt 37 which is trained about a sprocket 51 on the output shaft of the transmission unit 36; over a sprocket 52 which operates the pressing assembly 26 on framework 24; under a sprocket 53 on a shaft 44 of roller 40 on framework 23; about a sprocket 52 of the assembly 26 on framework 23 and about suitable idler and tensioning sprockets 54. The chain belt 38 is trained about a second sprocket on the transmission output shaft and a sprocket 55 which drives the roller 40 on framework 24 through stub shafts 44 and the roller 45 through the chain belt 50.

Referring now to Fig. 4, it will be seen that the upper flight of conveyor belt 25, centrally of the framework and from the roller 39, is caused to pass over a roller 56, under a roller 57 and over a roller 58 while the return or lower flight of the conveyor belt 25 from the roller 40 passes under a roller 59 and again to the roller 39. The rollers 56 to 59, inclusive, are all of a special tubular construction in which the sleeve 60 is mounted on and affixed to bearings 61 carried on shafts 62. The shafts 62 of the rollers are generally supported on a frame 63, having longitudinally disposed end channels 64 and transverse channels 65, in such a fashion that they may be raised or lowered as a unitary assembly to change the inclination of those portions of the conveyor belt 25 between rollers 39 and 56 and rollers 58 and 40. As will be more fully hereinafter described, the raising and lowering of the rollers 56 and 58 to change the inclination of the moving conveyor belt 25 is for the purpose of adjusting the elevation of the belt to accommodate various curved contours of bent glass-plastic sandwiches and introduce them properly to the pressing assembly 26 and for receiving the same properly therefrom.

The frame 63 is accordingly equipped with threaded blocks 66 secured to the end framing channels 64 (Fig. 5). The blocks 66 receive vertically disposed, threaded rods 67 which are formed, near their lower ends, to receive bearing collars 68 and immediately at their lower extremities, bevel gears 69. The bearing collars 68 are of a two part construction of which an upper collar portion 70 is suitably pinned to the rod 67 while the lower collar portion 71 has a shouldered upper surface received in an opening formed in a beam or channel 72 carried on the angle beams 31 and 32 of the frameworks 23 or 24. The bevel gears 69, associated with rods 67 at each end of a frame 63, mesh with complementary bevel gears 73 on shaft 74 rotatably mounted in plates 75 depending from the channels 72. The shaft 74 is provided at one end thereof with a crank 76 by which the bevel gears 69 and 73 will be caused to rotate thus rotating the threaded rods 67 and moving the blocks 66 therealong to raise or lower the frame 63.

In order that this frame will properly move in a vertical direction, vertically disposed rods 77, mounted in bases 78 on the channels 72, are received in guide blocks 79 carried by the frame. Preferably the rods 77 are arranged in pairs equally spaced at opposite sides of the threaded rods 67 as may be seen in Fig. 4. Thus as the crank 76 is rotated, the frame 63 and rollers 56 to 59 will be raised or lowered as the treaded blocks 66 are caused to traverse the threaded rods 67 that are rotated by the pairs of bevel gears 69 and mating bevel gears 73 on the shaft 74.

As shown diagrammatically in view "a" of Fig. 14, the sandwich A will be carried on conveyor belt 25 toward and into the pressing assembly 26 and the upper flight of the said belt will be disposed so that, as indicated in broken line, the sandwich at its leading area L will enter along a tangential plane common to the pressing rolls 80 and 81 of the assembly 26. By raising or lowering the frame 63, it will now be seen that variations of curvature of the bent glass sheets can be compensated for and adjustment in elevation of the rollers 56 and 58 will permit desirable entry of the sandwich between the rolls 80 and 81.

The rolls 80 and 81 of each pressing assembly 26 are mounted in such a fashion that they may be swung or oscillated or rocked through an arc generated from a common axis located substantially midway between and in parallel alignment with the individual axes of the rolls. Also the rolls are normally oriented in such positions that a line drawn through their axes will be so angularly disposed to the perpendicular as to dispose the rolls in an adjusted position in which the leading area L of the glass-plastic sandwich A will enter therebetween along the desired tangential plane that is common to both of the rolls. And provision is herein made to oscillate the rolls to a second position in which the sandwich will leave the rolls with its following area F in a like tangential plane common to both of the rolls. Thus, the rolls 80 and 81 will be normally located in the position illustrated in view "a" of Fig. 14 and oscillation of the rolls will be first in the direction of the arrow in this view and then in the reverse direction indicated by the arrow of view "c," which is intended to denote the movement of the rolls from the full line position to the broken line position which is the same at that of the first position of view "a." The rolls, in view "a," are therefore substantially positioned to receive the leading area L of a glass-plastic sandwich as it enters the pressing assembly 26 from the conveyor belt 25 and, in view "c," they are positioned at a time when the following area F is leaving the pressure area and the sandwich is again supported by the conveyor belt 25.

The rolls 80 and 81 of each pressing assembly 26 are generally carried in a pivotally mounted carriage which is not only adapted to oscillate the rolls and to provide a driving connection therefor from the gear 52 and sprocket chain belt 37 but which is also adapted to "floatingly" support the roll 81 for movements toward and away from contact with the roll 80. For this purpose, each of the rolls are of substantially the same construction and are carried at their ends in pivot housings 82 and 83. The housings 82 and 83 are rotatably supported by outwardly directed shafts in pillow blocks or bearings 84 fixedly secured to the upper surface of side channels 28 of the frameworks 23 and 24.

The housing 82 is mounted by the shaft 85 that is of a tubular construction having a flanged inner end 86 by which said shaft is secured to the housing. The inner surface of the tubular shaft is finished to receive bearings 87 in which is journaled a drive shaft 88. One end of the shaft is extended outwardly through the bearing cap 89 and has mounted thereon the sprocket 52. The opposite end of the shaft 88 carries a spur gear 90.

The housing 83 is mounted by the tubular shaft 91 in the corresponding pillow bearing 84. Similarly to the shaft 85, the shaft 91 has a flange 92 by which it is secured to the housing 83. Outwardly of the cap 89 of this bearing 84, the shaft 91 carries a crank arm 93 by which the oscillating mechanism 27 causes "rocking" motions of the pressing assembly 26. The housing 82 by shaft 85 thus supports the rolls 80 and 81 at the "driving" side of their assembly while the housing 83 by shaft 91 supports the rolls at the "rocking" side of the assembly.

Each of the rolls 80 and 81 are formed by an annular sleeve 94 on which are arranged rubber rings 95 that are spaced apart by washers 96. The rings 95 afford a resilient, yet frictional contacting surface for each roll against the glass surfaces. The rubber rings also provide a plurality of individual, spaced areas of pressure that are adapted, by reason of the rubber's resiliency, to absorb and follow slight irregularities which may exist transversely across the sandwich. At one end of each of the sleeves 94, a hub 97 is mounted having an enlarged annular flange 98. The rings 95 and washers 96 are mounted on the sleeves 94 and, in their plurality, are maintained fixedly against the flange 98 by a locking ring 99 that is fixedly secured to the sleeve by set screws 100.

In order that the resilient surfaces of the rolls 80 and 81 of one assembly 26 can operate on a longitudinal strip along one marginal area of the glass-plastic sandwich, and those in the second assembly 26, on a longitudinal strip along the opposite marginal area of the sandwich, the rings 95 forming such surfaces are arranged to extend inwardly from opposite sides of the pressing apparatus as may be seen in Fig. 3.

The opposite end of the sleeves 94 has a hub 101. The hub 101 and the hub 97 are each formed to have cylindrical surfaces common in diameter to the outer diameter of the sleeve 94 and an inner end portion of reduced diameter on which the wall of the sleeve is received. A rigid connection between the sleeve 94 and the hubs 97 and 101 is afforded, in a conventional manner, by machine bolts 102 threaded into the said hubs and with the heads thereof located in drive-holes in the walls of the sleeves 94 (Fig. 5). Internally each hub is shaped to receive a bearing and, for purposes of clarity, the sleeve 94 and hubs 97 and 101 of roll 80 are rotatably mounted by bearings 103 on a shaft 104 while the similar sleeve and hubs of sleeve 81 are mounted by bearings 103 on a shaft 105.

The ends of the shaft 104 are received in and fixedly secured to one end of the housings 82 and 83 by suitable keys and nuts 106 so that the sleeve 94 of roll 80 will be rotatably mounted relative to the respective housings and at a predetermined distance from the aligned shafts 85 and 91. The shaft 105 of roll 81, however, is mounted so that the roll 81 can be urged into and out of contact with the roll 80.

For this purpose, the ends of the housings 82 and 83, opposite the mounted ends of the shaft 104, have an annular chamber 107 formed therein which receives a piston 108. The piston 108 has an annular bore, formed at a right angle to its axis and which is aligned with a slotted aperture 109 in the housings 82 and 83. The ends of the shaft 105 extend through slots 109 and are carried in the pistons. The chambers 107 of each housing are closed by a cap plate 110 that has a passageway intended for connection to a source of air pressure and a central opening aligned with the axis of the chamber 107. A threaded rod 111 is received in this central opening and at its inner end is secured to the piston 108. Nuts 112 are threaded onto the outer end of the rod 111 to limit the extent of inner motion of the piston 108 and, more particularly, control the contact pressure of the roll 81 against a glass-plastic sandwich supported by the roll 80. Air pressure is directed to the chambers 107 of housings 82 and 83 by flexible tubing 113 that is connected to a piping system 114 which serves both chambers 107 generally.

The rolls 80 and 81 are caused to rotate on their respective shafts 104 and 105 and in balanced unison by means of pairs of special tooth gears 115 that are connected to the ends of the sleeves 94 of each roll. More particularly, the sleeve hubs 101 have gear hubs 116 concentrically secured thereto and on which one pair of gears 115 are mounted thereon. The sleeve hub 97 of roll 81 similarly carries a gear hub 116 on which is mounted a gear 115 while the hub 97 of roll 80 has a gear hub 117 on which is securely mounted a special tooth gear 115 and a spur gear 118. The spur gear 118 meshes with and is driven by the spur gear 90 on the driving shaft 88. Thus the sprocket chain belt 37 through sprocket 52, shaft 88 and gear 90 will operate to provide rotation of the rolls 80 and 81 through spur gear 118 and the pairs of special tooth gears 115.

The teeth 119 of the gears 115 are of a particular formation which has been advantageously employed where a continuous transmission of power is necessary while there is a simultaneous movement occurring between the shafts on which the gears are mounted. Thus the gear drive, as shown in Fig. 9, from the spur gear 90 to the spur gear 118 and gears 115 will operate when rolls 80 and 81 are in rolling contact, as shown at "a" of Fig. 10, and a continuous operation will in a like manner be afforded when a glass-plastic sandwich A is passing between the rolls 80 and 81 as is shown at "b" in Fig. 10.

The pressing rolls 80 and 81 of each assembly 26 of the apparatus C or E are thus mounted by bearings 103 for independent rotation on their respective shafts 104 and 105 by means of the power drive through gears 115, and the roll 81 is adapted to be moved toward the roll 80 by the air pressure in the chambers 107 and thus exert pressure on a glass-plastic sandwich as it passes therebetween. However, since as previously set forth, the sandwiches herein shown have curved contours that are not adaptable to straight-away movement through the rolls and provision is made for locating the same in a definitely oriented position.

This oriented position of the rolls 80 and 81 is largely at a predetermined angle to the perpendicular, said angle being selected as normal, or at right angles, to the general plane in which the leading area of the glass-plastic sandwich A is disposed when the sandwich is supported and carried forwardly by the conveyor belt 25. Stated otherwise and referring to "a" in Fig. 14, when the central area or span of the belt carried by the rollers 56 and 58 has been adjusted to deliver the leading area of the glass-plastic sandwich substantially to the point of contact of the rolls 80 and 81, the said area, indicated at L, must preferably be disposed along a tangential plane common to both rolls. Accordingly, by adjusting the elevation of the rollers 56 and 58 on the frame 63 by means of the hand crank 76 and, further, the angular positions of the rolls 80 and 81, such a common plane of tangency can be obtained. Obviously for bends of various curvature, similar adjustments to the elevation of the conveyor belt supporting rollers and the angular positions of the pressing rolls will readily adapt the pressing apparatus to accommodate bent glass-plastic sandwiches of any required curvature. Not only is this an advantageous feature of the invention, but, as will be shortly set forth, the rolls 80 and 81 are adapted to subsequently be located in a second oriented position in which the sandwich emerges from the rolls. Since the curvature of the glass sheets will not always be identical at each end area, the second position may or may not be at a similar angle to the perpendicular. In fact, provision is herein made to control each angular positioning of the rolls, so that the leading area L ("a," Fig. 14) or the following area F ("c," Fig. 14) will pass between or from the rolls along a desired though not the same tangential plane. For this purpose, the oscillating mechanism 27 of each framework 23 or 24 is not only adapted to oscillate the related pressing assemblies 26 but is capable of adjustment to limit the extent of arc described by the assemblies as they are oscillated or "rocked" about the axes of the shafts 85 and 91.

The oscillating mechanisms 27 generally include a control rod 120 (Figs. 6 and 7) and linkage 121, pivotally connected in common to the crank arm 93, an actuating cylinder 122, and control devices 123 and 124 for directing the flow of pressure thereto. More particularly, the control rod 120, as illustrated in Figs. 6 and 7, is slidably mounted in a T-shaped support 125. The support 125 has a tubular section 126, having a central bore 127 conforming to the diameter of the rod and open-end bores or chambers 128 and 129 of increased diameter. Projecting at a right angle to the section 126 is a stub axle 130 of the support, said axle being rotatably carried in a bracket 131 mounted securely on a side channel 28 of the framework. The axle 130 preferably has a reduced shank 132 received in the bracket to provide a shoulder 133 abutting one face of said bracket and retained thereagainst by a washer 134 secured to the end of the shank 132 by a bolt 135 screw threaded therein.

The rod 120 is provided with threaded ends, as at 136, for receiving pairs of adjusting lock-nuts 137 and 138, and carried by the rod between the pairs of lock-nuts are buffer or bumper coiled compression springs 139. Outwardly of the lock-nuts 138, the rod has a clevis 140 connected at the end thereof. The clevis 140 and clevis shaped arm 141 of linkage 121 are interconnected with the arm 142 of crank 93 by a pin 143. The springs 139 absorb the jar of contact or impact as the pairs of nuts 137 or 138 on rod 120 are brought against the ends of the tubular section 126 and the springs are received in chambers 128 and 129 as the rod slides through the said tubular section. More than this, as the springs are compressed, they serve as resilient elements to ease the motion of the rod as it is moved in either direction by the linkage 121.

This linkage 121 is substantially a toggle arrangement comprising the clevis arm 141 and the piston rod 144 of cylinder 122. As best seen in Figs. 6 and 8, the clevis arm 141 and piston rod 144 are interconnected by an axle 145 which, outwardly on each side of the bifurcated end 146 of the rod 144, carries casters 147. The casters 147 are adapted to retain the bifurcated end 146 of rod 144 and the rod 144, particularly, in axial alignment with the cylinder 122 by being directively carried by bars 148 that are part of a support frame 149.

As herein shown, the frame 149 and cylinder 122 are each securely attached to an angle bracket 150 suitably mounted on a side channel 28. The support frame is formed by side walls 151 and top and bottom walls 152. The bars or guide tracks 148, as shown in Fig. 8, are affixed to the top and bottom walls 152. The piston (not shown) of rod 144 in the cylinder 122 accordingly will cause the rod to move inwardly and outwardly and, in so doing, be supported in axial alignment with the cylinder as the casters 147 traverse the guide tracks 148. This is quite necessary since movement of the rod 144 in either direction will swing the crank 93 through the connection of the clevis arm 141.

The arcuate motion of the arm 142 of crank 93 also causes the rod 120 to rotate the support 125 about the axis of the axle 130 in bracket 131 as the rod slides through the tubular section 126 and as well the clevis arm 141 to describe a slight arcuate movement relative to the piston rod 144 and about the axis of the axle 145.

As shown in Fig. 6, the rod 144 is located in its outermost position, the crank 93 and pressing assembly 26 in one position of angularity and the pair of lock-nuts 138 are in abutting contact with the support 125. When the piston rod 144 is moved to its innermost position, the clevis arm 141 will be operated to swing the crank 93 to a second angular position and the rod 120 moved through the support 125 until the lock-nuts 137 engage the support. The limits of rocking movement of the pressing assembly 26 are thus determined by the extent of movement of the piston rod 144 that is in turn, controlled by the positions of the lock-nuts 137 and 138 on the rod 120. Accordingly, the desired positions of the rolls 80 and 81 can easily be established and maintained by moving either the pair 137 or the pair 138 of lock-nuts along the threaded portions 136 of the control rod 120 to alter the distance of its movement on either side of the tubular section 126 of support 125.

In order that the exact angle to which the pressing assembly 26 and crank 93 are swung on either side of the perpendicular may be ascertained, the outer surface of the crank may be calibrated by suitable legends 153. A pointer 154 mounted on the adjacent side channel 28 may have a tip generally denoting a hypothetical perpendicular plane so that registry of the tip with any one of the legends 153 will readily determine the included angle or the angular position of the assembly 26. This has been found advantageous for ready adjustment of the assembly into variously desired positions for differently bent glass sheets as will be obvious. Once the proper angles are obtained, the pairs of lock-nuts 137 and 138, singly or both, may be moved along the control rod 120 to limit its motion in one or both directions and thereby the extent of "rocking" afforded the crank 93.

The cylinder 122 is connected through the control valve 123 by pipes 155 and 156 to a suitable source of air pressure, the valve being self-exhausting. The valve 123 is in the nature of a self-reversing solenoid-actuated type and therefore is caused to reverse the direction of air flow therethrough by means of the micro-limit switch 124. This switch is mounted on a bracket 157 carried by the pivotal housing 83. The switch 124 may be connected to the solenoid valve 123 by suitable conduits 158.

The limit switch is actuated by a special lever arrangement 159 that is engaged by the lower glass sheet of the glass-plastic sandwich A as the leading area L passes between or beyond the contact area of the rolls 80 and 81 and is disengaged after the following area F of the sandwhich has emerged from between the rolls and the sandwich bodily is supported on the conveyor belt 25 between rollers 58 and 40. For this purpose, the lever arrangement 159 includes a rod 160 carried at one end in the bracket 157 on housing 83 and at its opposite end in a similar bracket 161 on the pivotal housing 82. On one end of the rod 160 is an arm 162 adapted to actuate the switch 124 while at the opposite end, two arms 163 and 164 are carried (Figs. 12 and 13).

The arm 163 is attached to an adjusting screw 165, carried in bracket 166, by a tension spring 167, the action of the spring being to swing the arm 163, rotate the rod 160 and maintain the arm 162 out of engagement with the limit switch 124. On the other hand, the arm 164 is adjustably secured on the rod 160 so that rotation of the rod will be stopped when the arm end strikes the surface of housing 82. This rotation of the rod is produced by tension of the spring 167, the spring being distended by arm 163 when and as the rod 160 is rotated to carry the arm 162 into engagement with the actuating plunger of switch 124. And the rod 160 is caused to rotate as the leading area of a glass-plastic sandwich is moved by the rolling contact of the rolls 80 and 81 to a position as is generally indicated in full line at "a" of Fig. 14.

For this purpose, midway between the pivot housings 82 and 83, the rod 160 carries a T-shaped support 168, the cross-arms of the support serving as axles 169 for rubber covered casters 170 (Fig. 11). Upon reference to Fig. 4, it will be seen that the casters 170 are disposed above the line of movement of the sandwich past the rolls 80 and 81 or the tangential plane common to both rolls. Thus, as the glass-plastic sandwich engages the casters 170, it will cause the T-shaped support to rotate the rod 160, against spring 167, sufficiently to bring the arm 162 thereon into engagement with the limit switch 124. Now, through conduits 158, the valve 123 will be actuated to direct pressure by pipe 155 to the cylinder 122 to move the piston rod 144 inwardly. Through the clevis arm 141, the rod 144 will swing the crank 93 and the pressing assembly 26 from the angular position shown in Figs. 6 and "a" of Fig. 14; through the perpendicular as at "b" and to the second angular position shown in full line at "c" of Fig. 14. The scope of this oscillation or rocking motion imparted to the assembly 26 will be determined by the position of the lock-nuts 137 on the control rod 120 so that, as the associated coil spring 139 enters the chamber 128 of support 125, the rocking motion will slowly be halted until the nuts 137 abut the end of said support.

Then, as the following area F of the sandwich is carried out of contact with the casters 170, the spring 167 will cause the rod 160 to rotate in a reverse direction until stopped by engagement of arm 164 on the housing 82. This will disengage arm 162 from the switch 124, allowing the same to open and causing the valve 123 to reverse the air connections therethrough and directing pressure through pipe 156. As the piston rod 144 moves outwardly, the clevis arm 141 will swing the arm 93, but in the opposite direction, until the lock-nuts 138 abut the support 125 after the associated spring 139 has entered the chamber 129 and compressingly eased the rate of swing movement. The rolls 80 and 81 will now be located in their original angular position to again receive the leading area of a subsequent glass-plastic sandwich.

The conveyor belt 25, the pressing roll assembly 26 and oscillating mechanism 27 of each of the frameworks 23 and 24 are so inter-related in their operation that a substantially constant rate of movement of the glass-plastic sandwich through the apparatus will be effected. As mentioned earlier in the specification, the conveyor belts 25 and the rolls 80 and 81 of each assembly 26 are driven in common by the sprocket chain belt 37 and the sprockets 52, 53 and 55, said sprockets 52 being so proportioned in diameter to sprockets 53 and 55 that the rolls 80 and 81 will revolve with a surface speed comparable to the speed of movement of the associated conveyor belt. This assures that the sandwich will be received between, passed through and discharged from the rolls 80 and 81 at the same speed of movement at which it is carried by the conveyor belt. Also the timing of the oscillating mechanism 27 is adjusted so that the rolls will be swung or rocked from the position as at "a" of Fig. 14 to the position as at "c" while the central area of the sandwich is passing therebetween. The piston rod 144 of cylinder 122 is thus moved inwardly to swing the crank 93 and rolls 80 and 81 in a definitely timed interval to the movement of the sandwich so that it is neither lifted from the conveyor belt nor again deposited thereon while only an end area of the sandwich is engaged and passing between the rolls. In consequence, the progressive, forward movement of the sandwich is constant and there will be no sudden increase of motion or lifting of the sandwich when its major portion is unsupported.

Adjustment of the pressing assembly 26 and the oscillating mechanism 27 to accommodate various modifications of bent curvature may be made first by determining the best angular position of the rolls 80 and 81 for receiving a glass-plastic sandwich, or by referring to the legends 153 on the arm 93 and their relation to the pointer 154 and checking the same against previously noted registrations. This position is then established by positioning of the locknuts 138 against the end of the support 125. The lever arrangement 159 is now operated manually or otherwise and, through switch 124, the valve 123 directs air pressure by pipe 155 to the cylinder 122 to move the piston rod 144 inwardly. When the locknuts 137 abut the support 125, the assembly 26 will have been moved to its second angular position. Should this position not agree with that required, the lock nuts 137 are moved along the rod 120 to either increase or decrease the angle as will be denoted by the registration of the legends 153 with the pointer 154.

In order that the timing may be adjusted for causing the rocking motion of the assembly 26, the arm 164 is temporarily released from its fixed relation on the rod 160 and is moved until by its engagement with the surface of the pivot housing 82, the casters 170 will be moved generally toward or away from the rolls 80 and 81. This will alter the position of the casters so that engagement with a sandwich passing through said rolls will be hastened or retarded. The assembly 26 accordingly will be caused to rock from its first to second angular position after a shorter or longer interval of movement of the sandwich therethrough.

Further, the rolls 56, 57 and 58 may be raised or lowered by movement of the frame 63. This action will change the angle of inclination of the flights of the conveyor belt 25 between rollers 39, 56 and 58, 40. Actually, to alter the apparatus for differently bent glass sheets, it is important that the conveyor belt 25 be inclined at a proper angle and the rolls 80 and 81 be oriented at a proper angle to receive the leading area of the sandwich as it is carried forwardly on the conveyor belt and brought to said rolls at a tangential plane common to the rolls. As hereinbefore described, the frame 63, carrying rollers 56 to 59 inclusive, is raised or lowered in a vertical direction, as determined by the rods 77, during rotation of the threaded rods 67 by the crank handle 76, bevel gear 73 on shaft 72 and bevel gears 69 on said threaded rods.

Reviewing the operations of the pressing apparatus C and E briefly, it will now be understood that a glass-plastic sandwich A is received on the framework 23 of apparatus C, from the assembly room B, and will be carried forwardly until the leading edge L enters between the rolls 80 and 81 of the assembly 26 thereon. During passage of the sandwich between the rolls, a longitudinal strip along one marginal area will be lightly pressed to exhaust entrapped air therefrom. Also, as the sandwich proceeds through the assembly 26, the casters 170 will be engaged and the rod 160 rotated to actuate the switch 124 by arm 162. As the assembly 26 is thus oscillated or rocked, the sandwich is bodily raised from the conveyor belt between rollers 39 and 56 and is likewise swung or rocked until the leading area of the same is deposited on the conveyor belt between rollers 58 and 40.

When the following area of the sandwich leaves the vicinity of the rolls 80 and 81, it will move from engagement with the casters 170, thereupon causing opening of switch 124 and automatic reversal of the valve 123 so that the assembly 26 is rocked to its original angular position ready for a subsequent sandwich. Proceeding from the conveyor belt 25 of framework 23 to the belt on framework 24, the glass-plastic sandwich enters the second pressing assembly 26 and is subjected to light pressure in a longitudinal strip along the opposite marginal area thereby completing the first pressing action. Herein the sandwich causes the previously described sequence of events to similarly occur so that the second assembly 26 is rocked about to replace said sandwich again on the conveyor belt.

From the apparatus C, the sandwich is carried through the heated oven D and emerges to be received on the conveyor belt 25 of the framework 23 of apparatus E. Since the plastic interlayer of the sandwich A has been slightly softened in the oven D, the subsequent pressures to which the sandwich is, in alternate sequences, subjected assures that the surfaces of the glass sheets and plastic will be fully in contact and the peripheral edge of the sandwich will be adequately sealed. Thus the second pressing apparatus E duplicates the actions of the first and the assembled sandwich is taken therefrom for the final compositing in the heat and pressure of an autoclave.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In apparatus for pressing together the sheets of a curved glass-plastic sandwich, the combination with means for conveying the sandwich in a defined path transversely to an axis of curvature thereof, of a pair of substantially parallel rolls disposed transversely of said path and providing a confined passage therebetween to receive said sandwich, means for mounting said rolls as a unit about an axis parallel to said rolls for rocking movement of said unit relative to said conveying means from a first position for receiving the forward end of said sandwich in said confined passage along a tangential plane common to both of said rolls to a second position for releasing the rearward end of said sandwich from said passage, and means for rotating said rolls in opposite directions for simultaneously moving said sandwich therebetween during the rocking thereof from said first to said second position.

2. In apparatus of the character defined in claim 1, means for resiliently pressing said rolls together along said confined passage.

3. In apparatus for pressing together the sheets of a curved glass-plastic sandwich, conveyor means for moving said sandwich in a defined path transversely to an axis of curvature thereof, a pair of substantially parallel rolls disposed transversely of said path to provide a confined passage therebetween which is located above said conveyor means and parallel to said axis of curvature of the sandwich, means for rotating said rolls in opposite directions to provide driving movement through said confined passage, and means for rocking said rolls as a unit to receive the forward end of said sandwich from the conveyor means at one side of said rolls then tilt said sandwich and finally release the rearward end of said sandwich onto the conveyor means at the other side of said rolls after said sandwich has been moved through said confined passage.

4. In apparatus of the character defined in claim 3, means for resiliently pressing said rolls together along said confined passage.

5. In apparatus of the character defined in claim 4, means disposed along the path of said sandwich for actuating said rocking means.

6. In apparatus of the character defined in claim 4, means adapted to be contacted by said sandwich upon passing through said confined passage for actuating the rocking of said rolls from said receiving to said releasing position.

7. In apparatus of the character defined in claim 4, means for limiting the rocking of said rolls so as to receive the forward end of said sandwich in said confined passage along a tangential plane common to both of said rolls.

8. In apparatus of the character defined in claim 4, means for limiting the rocking of said rolls so as to release the rearward end of said sandwich from said confined passage along a tangential plane common to both of said rolls.

9. In apparatus of the character defined in claim 4, means for limiting the rocking of said rolls so as to receive the forward end in and release the rearward end of said sandwich from said confined passage along tangential planes common to both of said rolls.

10. In apparatus for pressing together the sheets of a curved glass-plastic sandwich, conveyor means for moving the sandwich in a defined path transversely to the axis of curvature thereof, a first pair of substantially parallel rolls extending transversely over a portion of said conveyor means, a second pair of substantially parallel rolls spaced from said first pair and extending transversely over another portion of said conveyor means, each of said pairs of rolls defining confined passages therebetween, means for rotating the rolls of each pair in opposite directions and pressing the same together to provide driving movement in the same direction through each of said confined passages, and means for selectively rocking each of said pair of rolls as a unit for receiving the forward end of said sandwich from the conveyor at one side of each pair of said rolls and then releasing the rearward end of said sandwich onto the conveyor at the other side of each pair of said rolls after the sandwich has been moved through the respective confined passage thereof.

11. Apparatus for the preliminary pressing of bent laminated assemblies comprising two sheets of glass and an interposed sheet of thermoplastic material which are to be bonded together into a unitary structure by the action of heat and pressure, which apparatus comprises, in combination, a supporting structure, a housing pivotally mounted on a horizontal axis in said supporting structure, a pair of cooperating nipper rolls mounted horizontally one above the other in said housing, means for conveying a bent laminated glass and plastic assembly along a path toward the rolls with the axis of curvature of the bend substantially parallel to the axes of the rolls, means for turning said housing about its pivotal axis to receiving position at which the bent forward edge of the laminated assembly will enter between and be gripped by the rolls as the assembly is conveyed toward the rolls, means for driving the rolls to feed the laminated assembly through between the rolls, the mounting means for said housing permitting turning movement of the housing about its pivotal axis within a limited range as the laminated assembly is fed through between the rolls, means for receiving the laminated assembly as it is discharged from between the rolls and for conveying the assembly away from the rolls and means for creating relative movement vertically between said housing and the means for conveying the bent laminated glass and plastic assemblies toward the rolls to bring the bite of the rolls to the height of the bent forward edge of the assembly when the housing is turned to receiving position.

12. Apparatus for the preliminary pressing of bent laminated assemblies comprising two sheets of glass and an interposed sheet of thermoplastic material which are to be bonded together into a unitary structure by the action of heat and pressure, which apparatus comprises, in combination, a supporting structure, a housing pivotally mounted on a horizontal axis in said supporting structure and having a limited range of oscillatory movement about its axis, a pair of cooperating nipper rolls mounted horizontally one above the other in the housing, means for driving the rolls, and means directly connected to the supporting structure for intermittently turning the housing to one limit of its range to receive the forward edge of a bent laminated assembly.

References Cited in the file of this patent

UNITED STATES PATENTS

| | | |
|---|---|---|
| 2,025,115 | Lytle | Dec. 24, 1935 |
| 2,334,651 | Schafer | Nov. 16, 1943 |
| 2,525,980 | Walters | Oct. 17, 1950 |
| 2,628,177 | Boicey | Feb. 10, 1953 |
| 2,635,973 | Swindler | Apr. 21, 1953 |
| 2,673,168 | Pascoe et al. | Mar. 23, 1954 |